US009571547B2

(12) United States Patent
Le Leannec et al.

(10) Patent No.: US 9,571,547 B2
(45) Date of Patent: Feb. 14, 2017

(54) METHOD AND DEVICE FOR GENERATING MEDIA FRAGMENT REQUESTS FOR REQUESTING FRAGMENTS OF AN ENCODED MEDIA STREAM

(75) Inventors: Fabrice Le Leannec, Mouaze (FR); Franck Denoual, Saint Domineuc (FR); Nael Ouedraogo, Coutouse Maure de Bretagne (FR)

(73) Assignee: CANON KABUSHIKI KAISHA, Tokyo (JP)

( * ) Notice: Subject to any disclaimer, the term of this patent is extended or adjusted under 35 U.S.C. 154(b) by 561 days.

(21) Appl. No.: 14/004,861

(22) PCT Filed: Mar. 14, 2011

(86) PCT No.: PCT/IB2011/000749
§ 371 (c)(1),
(2), (4) Date: Nov. 13, 2013

(87) PCT Pub. No.: WO2012/123773
PCT Pub. Date: Sep. 20, 2012

(65) Prior Publication Data
US 2014/0059171 A1    Feb. 27, 2014

(51) Int. Cl.
*G06F 15/16* (2006.01)
*H04L 29/06* (2006.01)
(Continued)

(52) U.S. Cl.
CPC .......... *H04L 65/60* (2013.01); *H04L 65/4092* (2013.01); *H04L 65/602* (2013.01);
(Continued)

(58) Field of Classification Search
CPC .................................................. H04L 65/4092
(Continued)

(56) References Cited

U.S. PATENT DOCUMENTS

| 6,199,107 B1 | 3/2001 | Dujari | |
|---|---|---|---|
| 2006/0285397 A1* | 12/2006 | Nishihara | G06F 3/061 365/185.33 |

(Continued)

OTHER PUBLICATIONS

Thomas Stockhammer et al.; "Dynamic Adaptive Streaming over HTTP Design Principles and Standards," Qualcomm Incorporated, pp. 1-3; XP007916969.

*Primary Examiner* — David Lazaro
*Assistant Examiner* — Marie Georges Henry
(74) *Attorney, Agent, or Firm* — Canon USA, Inc. IP Division

(57) ABSTRACT

One embodiment concerns a method for generating a media fragment request for requesting fragments of an encoded media stream stored on a server device, the method being implemented by a client device storing a structure representative of fragments of the media stream previously received and stored on the client device. The structure includes first and second types of addressing information associated with fragments already received. The method for generating a media fragment request includes forming a media fragment request to obtain missing media data corresponding to a new fragment of the media stream, the media fragment request specifying at least one piece of addressing information of the first type and at least one addressing information of the second type, wherein the first type of addressing information is spatial or temporal information and wherein the second type of addressing information is byte position information within the media stream.

14 Claims, 10 Drawing Sheets

(51) Int. Cl.
  *H04N 21/231* (2011.01)
  *H04N 21/442* (2011.01)
  *H04N 21/61* (2011.01)
  *H04N 21/845* (2011.01)
  *H04N 21/854* (2011.01)

(52) U.S. Cl.
  CPC . *H04N 21/23106* (2013.01); *H04N 21/44209* (2013.01); *H04N 21/6175* (2013.01); *H04N 21/8455* (2013.01); *H04N 21/85406* (2013.01)

(58) Field of Classification Search
  USPC .................................................. 709/217, 238
  See application file for complete search history.

(56) References Cited

U.S. PATENT DOCUMENTS

| | | | |
|---|---|---|---|
| 2008/0256255 A1* | 10/2008 | Mordovskoi | H04N 21/2381 709/231 |
| 2010/0235528 A1* | 9/2010 | Bocharov | H04N 21/6437 709/231 |
| 2010/0318632 A1 | 12/2010 | Yoo et al. | |
| 2011/0022471 A1* | 1/2011 | Brueck | G06Q 30/02 705/14.61 |

* cited by examiner

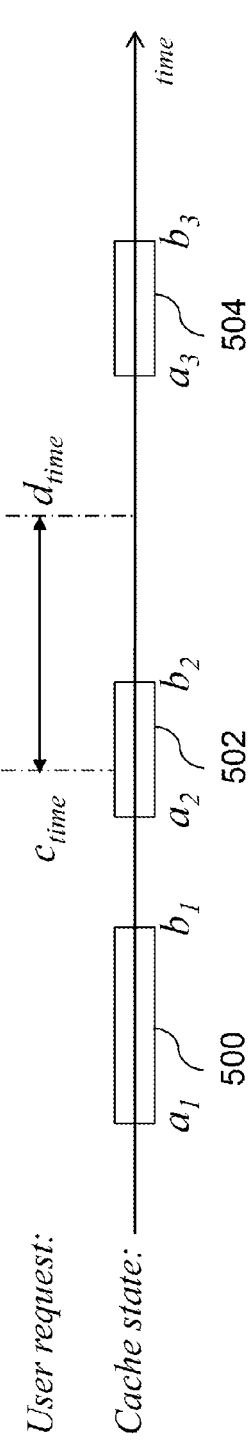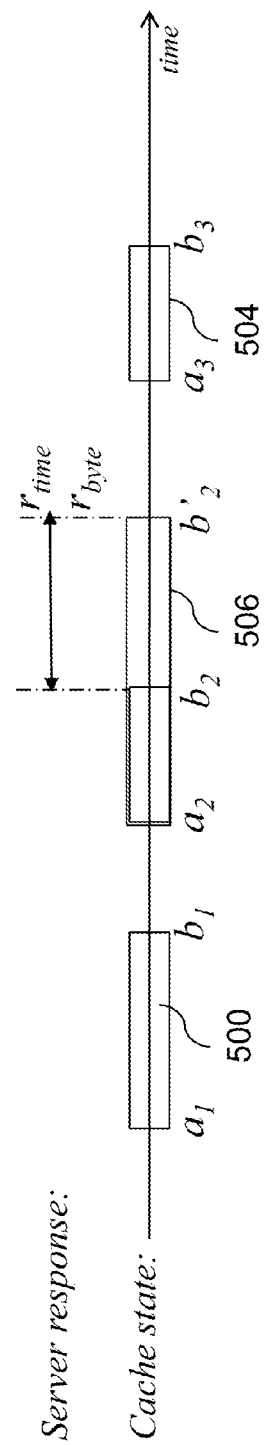

METHOD AND DEVICE FOR GENERATING MEDIA FRAGMENT REQUESTS FOR REQUESTING FRAGMENTS OF AN ENCODED MEDIA STREAM

FIELD OF THE INVENTION

The invention relates to a method and device for generating media fragment requests for requesting fragments of an encoded media stream, an associated method and device for receiving media fragments of an encoded media stream on a client device and an associated method and device for sending, from a server device to a client device, fragments of an encoded media stream.

The invention belongs to the field of multimedia processing, and in particular of video processing and transmission between a server and client on a communication network.

DESCRIPTION OF THE PRIOR-ART

With the development of communication networks of high bandwidth, it became common to download videos or portions of video on client devices, such as personal computers connected to the Web for example.

In particular, the World Wide Web (W3C) consortium, an international body defining various standards for the Web, has defined a protocol for exchanging multimedia portions, typically video, also referred to as 'media fragments' in the specification "Media Fragment URI 1.0" (abbreviated to "MF URI 1.0"). This protocol is adapted to requesting various types of media fragments, such as a temporal fragment defined by a time interval of a video sequence or a spatial fragment defined by a spatial viewing window and a time interval of the video sequence.

An example of a system comprising a server 10 and a client 15 adapted to transmit media fragments is illustrated in FIG. 1. The server 10 comprises a Web server 100, such as for example a HTTP (Hypertext Transfer Protocol) server conforming to the HTTP/1.1 protocol and a Media fragment server 120. The Media fragment server is adapted to extract video portions from video sequences, stored locally for example in a memory which is not represented in the figure, according to the requests received from the client, typically conforming to the specification "Media Fragment URI 1.0".

The client 15 comprises a Web browser 150 and a Media fragment client 160. The Web browser 150 can both receive requests from a user via an interface, and send HTTP requests and receive HTTP responses, typically conforming to the HTTP/1.1 protocol. The Media fragment client 160 is adapted to receive responses from the Media fragment server 120, including portions of video sequences, also called video substreams. For simplicity, FIG. 1 does not illustrate intermediate network elements, such as routers and proxies which may be between the server and the client.

As illustrated in FIG. 1, the Web browser 150 receives user requests and transfers them to the Media fragment client 160, which transforms the requests into Media Fragments requests. The Media Fragments requests, for example following the specification MF URI 1.0, are sent to the Media Fragment server 120. The server retrieves data corresponding to the fragments of media requested in formatted Media Fragments responses according to the specification MF URI 1.0. The Media Fragments client receives the responses and transforms them into sub-streams, for example video substreams, which are then transmitted to the Web Client 150 which can for example display the substream or substreams to the user.

In the case of video transmission, a media fragment is typically a portion of a video sequence.

Since video data is very large, it is common to compress the video data before its storage and/or transmission. The most common video compression formats use some kind of prediction between portions of the video, so as to take advantage of the redundancies to improve the compression of the video data. Several known video compression formats, such as H.264 or MPEG-4 use so-called temporal prediction, wherein a portion of a current image of a video is predicted from one or several portions of images taken from other images of the video sequence, called reference images. This process is known as temporal prediction. As a result, the compressed data exhibits temporal dependencies.

A typical request for a video portion according to MF URI 1.0 format is a temporal request, specifying a time interval of the video. For example, the request: "http://www.server.com/video.mp4#t=10,20" is directed to a server which has the address 'www.server.com', and specifies the portion of the video 'video.mp4' comprised between time $t_0=10$ and time $t_1=20$.

According to the current MF URI 1.0 specification, a server extracts systematically a sub-stream that is self-contained, i.e. that can be decoded as a single, independent video by the client.

Consequently, if the video is compressed according to a temporal predictive format, it is necessary to extract a video portion starting with an INTRA encoded image, also called IDR picture, which is an image encoded without temporal dependencies. As illustrated in FIG. 2, if for example $t_0$, the start of the time interval requested in a first MF URI 1.0 request, does not correspond to an IDR picture, the server extracts a larger substream, comprised between the time $t_s$ and the requested time $t_1$, since $t_s$ corresponds to an IDR0, an INTRA encoded image of the sequence.

As further illustrated in FIG. 2, if a user sends a second request, for the video substream corresponding to the time interval $[t_1, t_2]$, again, if $t_1$ does not correspond to an IDR encoded picture, the Media Fragment server will send a larger portion of the video, noted second substream, starting at time $t'_s$ corresponding to the image IDR1 encoded as an INTRA image.

In such a scenario, a portion of the encoded video or substream is transmitted twice from the server to the client, as illustrated schematically in FIG. 2.

In case of repeated requests, the multiple transmissions of portions of video to the same client may occur repeatedly, causing a network overload as well as an overload of the storage on the client side. Moreover, the server needs to compute systematically the substream which is self contained and which contains a requested portion, in order to send it to the client.

A solution to minimize the amount of video portions transmitted several times would be to insert INTRA encoded pictures more regularly at the video encoding. However, INTRA pictures take a large amount of bitrate, and such a solution would largely increase the size of the encoded video streams, therefore overloading the servers and the communication networks.

It is desirable to avoid the multiple transmission of a same video portion from the server to a client in the context of media fragments transmission.

SUMMARY OF THE INVENTION

To that end, the invention relates to a method of generating a media fragment request for requesting fragments of an encoded media stream stored on a server device, the method being implemented by a client device storing a structure representative of fragments of said media stream previously received and stored on said client device, said structure comprising first and second types of addressing information associated with fragments already received. The method comprises:

forming a media fragment request to obtain missing media data corresponding to a new fragment of said media stream, said media fragment request specifying at least one piece of addressing information of the first type and at least one addressing information of the second type, wherein said first type of addressing information is spatial or temporal information and wherein said second type of addressing information is byte position information within said media stream.

Advantageously, the method of the invention provides the possibility for a client device to generate a media fragment request which mixes several types of addressing information, in particular comprising a byte position information. Such a byte position information allows a server to extract precisely only parts of the requested media fragment which are not yet present in the client device.

Correlatively, the invention relates to a device for generating a media fragment request for requesting fragments of an encoded media stream stored on a server device, said device being a client device storing a structure representative of fragments of said media stream previously received and stored on said client device, said structure comprising first and second types of addressing information associated with fragments already received. The device comprises:

means for forming a media fragment request to obtain missing media data corresponding to a new fragment of said media stream, said media fragment request specifying at least one piece of addressing information of the first type and at least one piece of addressing information of the second type, wherein said first type of addressing information is a spatial or temporal information and wherein said second type of addressing information is byte position information within said media stream.

Correlatively, the invention relates to a computer program which, when run on a computer, causes the computer to carry out a method of generating a media fragment request for requesting fragments of an encoded media stream as briefly described above.

Such a computer program may be transitory or non transitory. In an implementation, the computer program can be stored on a non-transitory computer-readable carrier medium. The particular characteristics and advantages of the device for generating a media fragment request for requesting fragments of an encoded media stream, and of the computer program being similar to those of the method of receiving fragments of media, they are not repeated here.

According to another aspect, the invention relates to a method of receiving, on a client device, fragments of an encoded media stream stored on a server device, wherein said client device stores a structure representative of fragments of said media stream previously received and stored on said client device, said structure comprising first and second types of addressing information associated with fragments already received. The method comprises the steps of:

forming a media fragment request using a method of generating a media fragment request according to a method of generating a media fragment request briefly described above, sending the formed media fragment request to the server device, and receiving at least one media fragment from said server device.

The invention thus provides the possibility for the client to keep track, in a stored structure, of the fragments already received and to specify only missing fragments in a request to the server. Advantageously, mixing several types of addressing information allows more flexibility in the requesting, and in particular allows specifying to the server more precise addressing information in some cases.

In particular, the first type of addressing information is a spatial or temporal information and the second type of addressing information is byte position information.

Advantageously, the client forms fragment requests mixing byte position addressing and time or space addressing. This avoids retransmission of already received fragments, if the client can precisely indicate for example a staring byte position of a newly required fragment, while it allows the client to specify any ending time for example for a fragment request.

According to an embodiment, the receiving method further comprises a step of storing said received media fragment or fragments in a local storage.

Typically, such a local storage may be a cache, or any type of storage space that can be accessed locally by the client device.

According to an embodiment, the receiving method further comprises receiving, from said server device, for each received fragment, at least one piece of addressing information of the first type and one piece of addressing information of the second type.

Advantageously, the media fragments received are described as temporal or spatial portions of the media stream, and each of their bounds is associated to a least one piece of addressing information of the first type and one piece of addressing information of the second type, typically a spatial or temporal address and a byte position address.

According to an embodiment, the receiving method further comprises a step of updating said structure representative of media fragments based upon the received pieces of addressing information.

According to an embodiment, the addressing information of said second type stored by said structure representative of media fragments includes, for each said media fragment, at least starting addressing information and ending addressing information, each of said starting addressing information and ending addressing information having an associated byte position value.

Advantageously, each received portion or fragments is described by its starting and ending addressing informations.

According to an embodiment, the updating step comprises, for each received media fragment:

checking whether said received media fragment has a common portion with a media fragment previously received and stored, and in case of positive checking, modifying one of the starting addressing information or the ending addressing information representative of said previously stored media fragment to designate an augmented stored media fragment.

Advantageously, the structure representative of media fragments can be easily updated with the received media fragments.

According to yet another aspect, the invention relates to a client device adapted to receive, fragments of an encoded media stream stored on a server device, wherein said client device comprises means for storing a structure representative of fragments of said media stream previously received and stored on said client device, said structure comprising first and second types of addressing information associated with fragments already received. The client device comprises:
- means for forming a media fragment request to obtain missing media data corresponding to a new fragment of said media stream, said media fragment request specifying at least one piece of addressing information of the first type and at least one piece of addressing information of the second type, wherein said first type of addressing information is spatial or temporal information and wherein said second type of addressing information is byte position information within said media stream,
- means for sending said formed media fragment request to the server device, and
- means for receiving at least one media fragment from said server device.

Correlatively, the invention relates to a computer program which, when run on a computer, causes the computer to carry out a method of receiving, on a client device, fragments of an encoded media stream stored on a server device as briefly described above.

Such a computer program may be transitory or non transitory. In an implementation, the computer program can be stored on a non-transitory computer-readable carrier medium. The particular characteristics and advantages of the client device for receiving fragments of an encoded media stream stored on a server device, and of the computer program being similar to those of the method of receiving fragments of media, they are not repeated here.

According to yet another aspect, the invention relates to a method of sending, from a server device to a client device, fragments of an encoded media stream stored on said server device. The method comprises the steps of:
- receiving a media fragment request specifying at least one piece of addressing information of a first type and at least one addressing information of a second type, wherein said first type of addressing information is spatial or temporal information and wherein said second type of addressing information is byte position information within said media stream,
- processing said media fragment request received to obtain at least one piece of byte position addressing information of a portion of said requested media fragment,
- extracting at least one media fragment of the encoded media stream corresponding to said at least one piece of byte position addressing information obtained,
- forming a response containing the extracted media fragment or fragments, and
- sending said formed response to the client device.

According to an embodiment, the sending method further comprises a step of inserting, in said response, for each said extracted media fragment, at least one piece of addressing information of the first type and one piece of addressing information of the second type representative of a starting point and/or an ending point of said extracted media fragment.

Advantageously, the server can easily extract position addressing information, in particular byte position addressing information relative to each of the extracted media fragments, and can send these informations to a client. In a particular case, such addressing information can be sent to a client, for example in a header part of a response message.

Correlatively, the invention relates to a server device adapted to send fragments of an encoded media stream stored on said server device to a client device, comprising:
- means for receiving a media fragment request specifying at least one piece of addressing information of a first type and at least one addressing information of a second type, wherein said first type of addressing information is spatial or temporal information and wherein said second type of addressing information is byte position information within said media stream,
- means for processing said media fragment request received to obtain at least one piece of byte position addressing information of a portion of said requested media fragment,
- means for extracting at least one media fragment of the encoded media stream corresponding to said at least one byte position addressing information obtained,
- means for forming a response containing said extracted media fragment or fragments, and
- means for sending the formed response to the client device.

Correlatively, the invention relates to a computer program which, when run on a computer, causes the computer to carry out a method of sending, from a server device to a client device, fragments of an encoded media stream as briefly described above.

Such a computer program may be transitory or non transitory. In an implementation, the computer program can be stored on a non-transitory computer-readable carrier medium. The particular characteristics and advantages of the server device for sending fragments of an encoded media stream, and of the computer program being similar to those of the method of receiving fragments of media, they are not repeated here.

According to yet another aspect, the invention relates to a media fragment request designating one or more fragments of an encoded media stream, said media fragment request specifying at least one piece of addressing information of a first type and at least one piece of addressing information of a second type, wherein said first type of addressing information is spatial or temporal information and wherein said second type of addressing information is byte position information within said media stream.

The particular characteristics and advantages of the digital signal carrying a media fragment request being similar to those of the method of generating a media fragment request for requesting fragments of an encoded media stream, they are not repeated here.

BRIEF DESCRIPTION OF THE DRAWINGS

Other features and advantages will appear in the following description, which is given solely by way of non-limiting example and made with reference to the accompanying drawings, in which:

FIGS. 5a and 5b illustrate schematically a client cache model;

DETAILED DESCRIPTION OF THE EMBODIMENTS

The invention will be described more particularly in the context of serving video fragments or video portions between a server and a client, the video being compressed according to a compression format with temporal dependencies. Nevertheless, the invention is not limited to the transmission of video and could apply for other media transmission/reception, such as for example audio streams.

Figure 3:
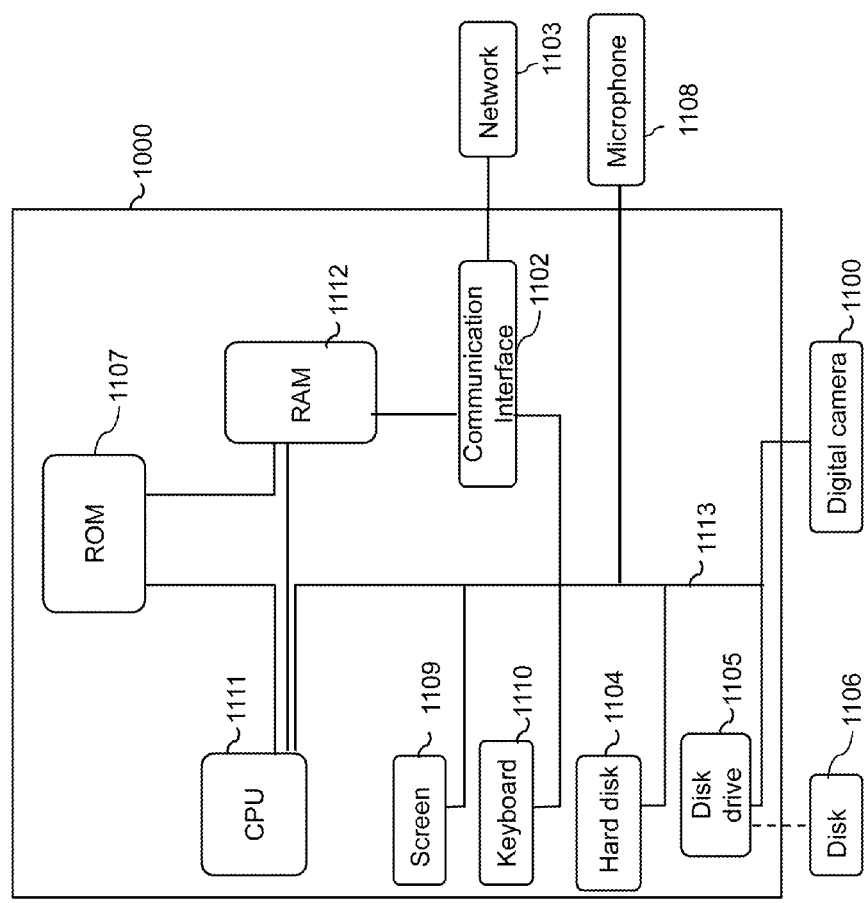
FIG. 3 is a diagram of a processing device adapted to implement an embodiment of the present invention.

FIG. 3 illustrates a diagram of a processing device 1000 adapted to implement one embodiment of the present invention. The apparatus 1000 is for example a micro-computer, a workstation or a light portable device.

The apparatus 1000 comprises a communication bus 1113 to which there are preferably connected:

- a central processing unit 1111, such as a microprocessor, denoted CPU;
- a read only memory 1107 able to contain computer programs for implementing the invention, denoted ROM;
- a random access memory 1112, denoted RAM, able to contain the executable code of the method of the invention as well as the registers adapted to record variables and parameters necessary for implementing the method of receiving media fragments; and
- a communication interface 1102 connected to a communication network 1103 over which digital data to be processed are transmitted.

Optionally, the apparatus 1000 may also have the following components:

- a data storage means 1104 such as a hard disk, able to contain the programs implementing the invention and data used or produced during the implementation of the invention;
- a disk drive 1105 for a disk 1106, the disk drive being adapted to read data from the disk 1106 or to write data onto said disk;
- a screen 1109 for displaying data and/or serving as a graphical interface with the user, by means of a keyboard 1110 or any other pointing means.

The apparatus 1000 can be connected to various peripherals, such as for example a digital camera 1100 or a microphone 1108, each being connected to an input/output card (not shown) so as to supply multimedia data to the apparatus 1000.

The communication bus affords communication and interoperability between the various elements included in the apparatus 1000 or connected to it. The representation of the bus is not limiting and in particular the central processing unit is able to communicate instructions to any element of the apparatus 1000 directly or by means of another element of the apparatus 1000.

The disk 1106 can be replaced by any information medium such as for example a compact disk (CD-ROM), rewritable or not, a ZIP disk or a memory card and, in general terms, by an information storage means that can be read by a microcomputer or by a microprocessor, integrated or not into the apparatus, possibly removable and adapted to store one or more programs whose execution enables the method of receiving media fragments according to the invention to be implemented.

The executable code may be stored either in read only memory 1107, on the hard disk 1104 or on a removable digital medium such as for example a disk 1106 as described previously. According to a variant, the executable code of the programs can be received by means of the communication network, via the interface 1102, in order to be stored in one of the storage means of the apparatus 1000 before being executed, such as the hard disk 1104.

The central processing unit 1111 is adapted to control and direct the execution of the instructions or portions of software code of the program or programs according to the invention, instructions that are stored in one of the aforementioned storage means. On powering up, the program or programs that are stored in a non-volatile memory, for example on the hard disk 1104 or in the read only memory 1107, are transferred into the random access memory 1112, which then contains the executable code of the program or programs, as well as registers for storing the variables and parameters necessary for implementing the invention.

In this embodiment, the apparatus is a programmable apparatus which uses software to implement the invention. However, alternatively, the present invention may be implemented in hardware (for example, in the form of an Application Specific Integrated Circuit or ASIC).

Figure 4:
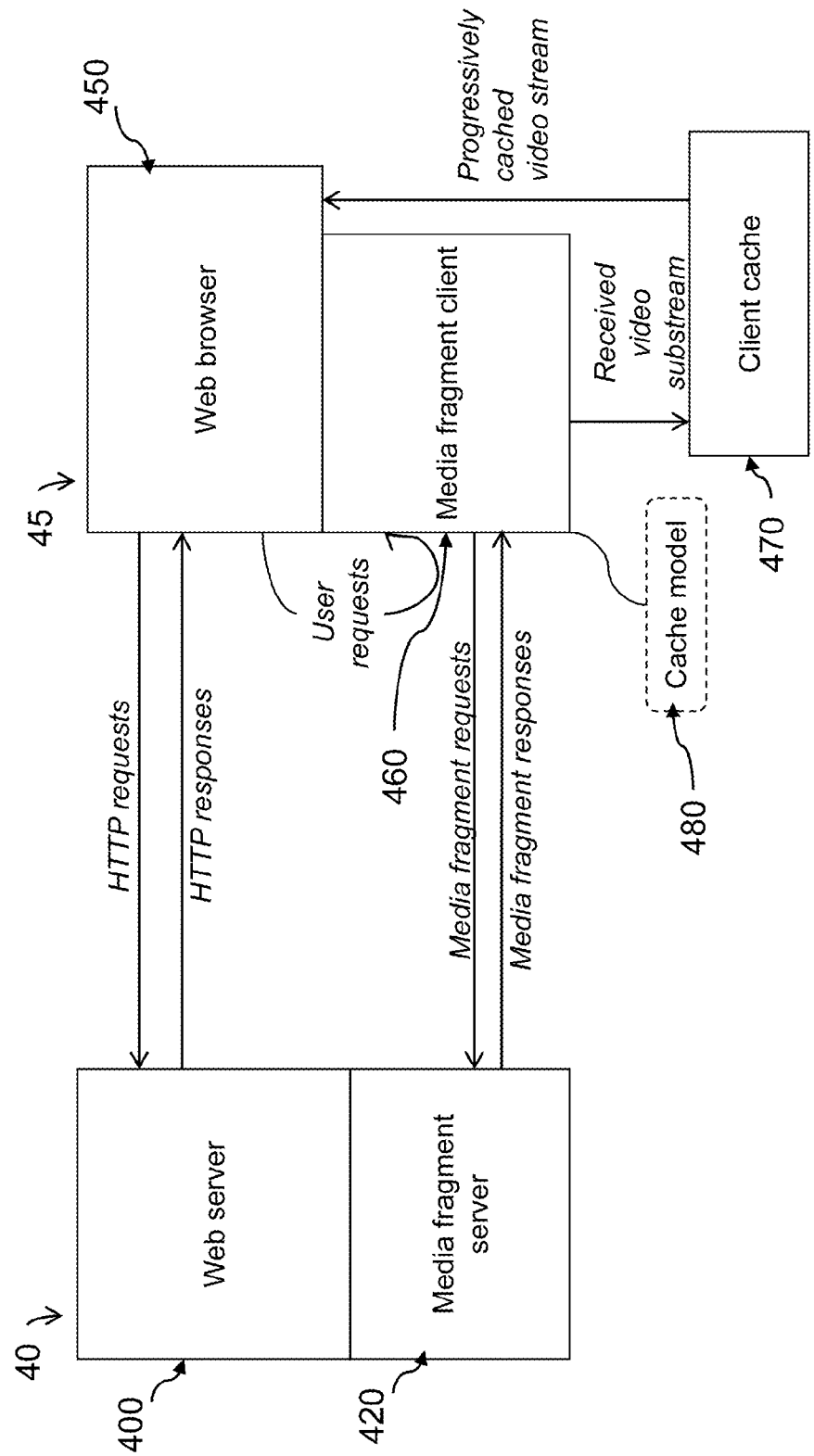
FIG. 4 illustrates a server-client system adapted to exchange media fragments in an embodiment of the invention.

FIG. 4 illustrates a system comprising a server 40 and client 45 adapted to exchange media fragments in an embodiment of the invention. This system is analogous to the classical system illustrated in FIG. 1 and already described, but it comprises new modules adapted to implement functionalities of the invention.

Figure 1:
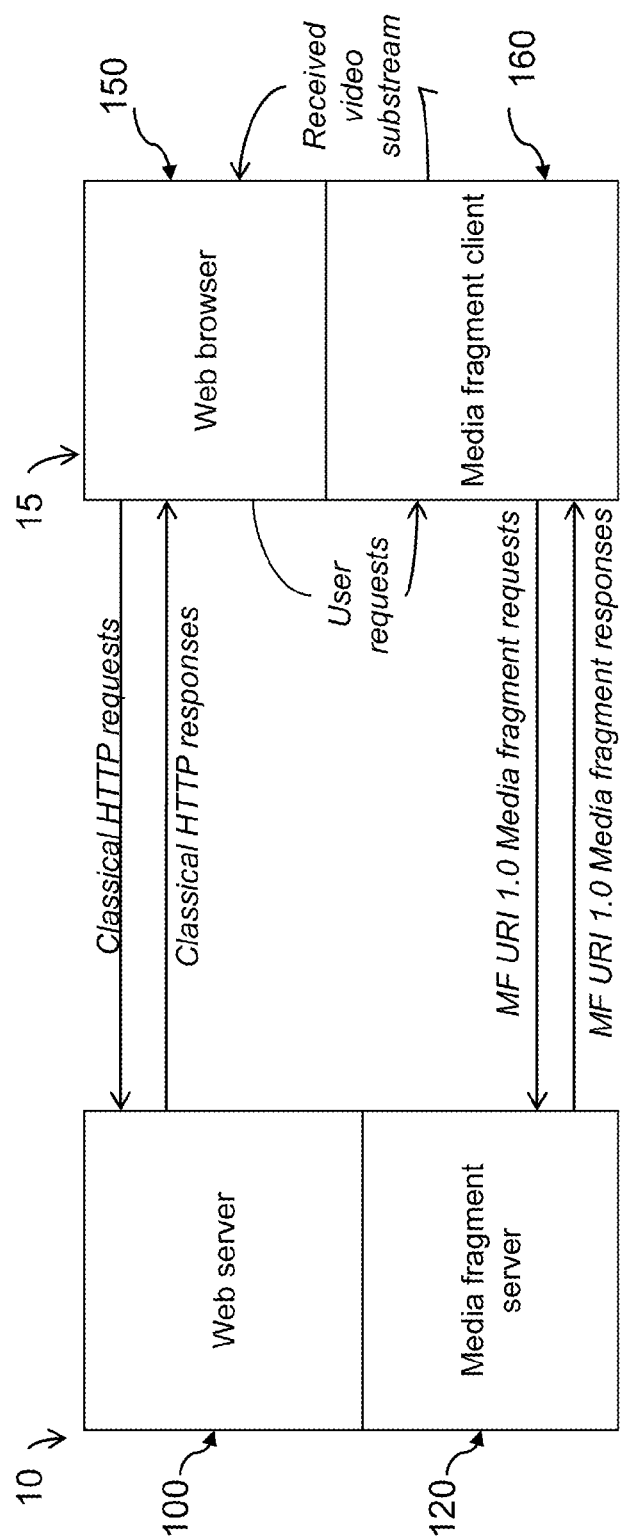
FIG. 1, already described, illustrates a server-client system adapted to exchange media fragments.

Similarly to FIG. 1, the system of FIG. 4 includes, in the server 40, a Web server 400 adapted to receive HTTP requests and to send HTTP responses, and a Media Fragment server 420, which is adapted to receive Media fragment requests formed as detailed hereafter and to send Media fragments responses containing information which is useful for a client 45 implementing the invention.

The client 45 comprises a Web browser 450, similar to the Web Browser 150 of FIG. 1, which can display for example a summary or a low resolution video to a user, and provides an interface which allows a user to request other portions of the video—or portions at a higher resolution, either spatial resolution or temporal resolution.

The user requests are then forwarded to a Media fragment client 460, which is adapted to generate media fragments requests as detailed hereafter and to send them to the Media fragment server 420. The Media fragment client 460 receives the media fragments, video portions in this example, from the Media fragment server 420.

The client 45 further comprises a cache or storage 470 for storing the video portions received from the Media fragment server 420. Also, the client device 45 maintains a cache model 480, which is illustrated separately here to underline its presence in the client 45. Typically, the cache model, which is typically a structure representing the fragments already received, is stored for example in the client cache 470 or in another memory of the client device 45.

The client 45 updates progressively the cache 470 and the cache model 480 with the received fragments. The newly received portions are ready to be displayed on the interface of web browser 450 for example.

It will be appreciated that the cached fragments may be stored in a given cache directory or a cache file, or in several physical locations on the client device.

The media fragment requests formed by the client device 45 are based on the Media Fragments URI 1.0 specification, but are modified according to the invention to contain several types of addressing information so as to avoid re-transmission by the server of the same video portions.

Taking the example of a request directed to a server for the time interval t=[10,20], "R=http://www.server.com/video.mp4#t=10,20". already mentioned, an HTTP request according to the current version of the protocol Media Fragment URI 1.0 is the following:
GET /video.mp4 HTTP/1.1
Host: www.server.com
Accept: video/*
Range: t:npt=10,20

Such a classical request specifies a time interval, so uniquely temporal addressing information.

It is proposed to modify such classical requests to form requests mixing several types of addressing information, typically mixing temporal addressing and byte-range addressing, so as to indicate both the time interval requested by the user as well as the status of the client cache related to the requested time interval. Therefore, incremental requests can be addressed to the server, allowing the server to avoid the retransmission of media fragments or video portions.

In a first embodiment, the classical media fragment request is modified as follows:
GET /video.mp4 HTTP/1.1
Host: www.server.com
Accept: video/*
Range: t:npt=10,20
Range: bytes=19147
Range-Combination: Difference The request contains, as the classical request, a first 'Range' field indicating a first type of addressing information, namely the starting time ($t_s$) and the ending time ($t_e$) of the media fragment requested by the user.

A supplementary field "Range:bytes" is added. This field contains partial information in this example, for example a byte-range starting at byte position b=19147. This second 'Range' field brings supplemental information about the status of the client cache 470. An additional field 'Range-Combination' is also added to indicate to the server how to combine the range fields, which each indicate a different type of addressing information, to obtain the missing video portions. In this example, the 'Range-Combination' field specifies 'Difference', meaning that the difference between the two ranges is missing in the client cache and should be sent. In this example, this means that the client cache contains information starting from the starting time $t_s$ up to the byte position b=19146, and that the video data starting at byte position 19147 and ending up at time $t_e$ is missing.

Other values could possibly be specified in the 'Range-Combination' field, such as Intersection or Union for example, to indicate to the server how to compute the fragments missing from the client cache using the ranges indicated.

In an alternative embodiment, the field 'Range-Combination' is optional, and for example the 'Difference' is implemented by default.

Figure 2:
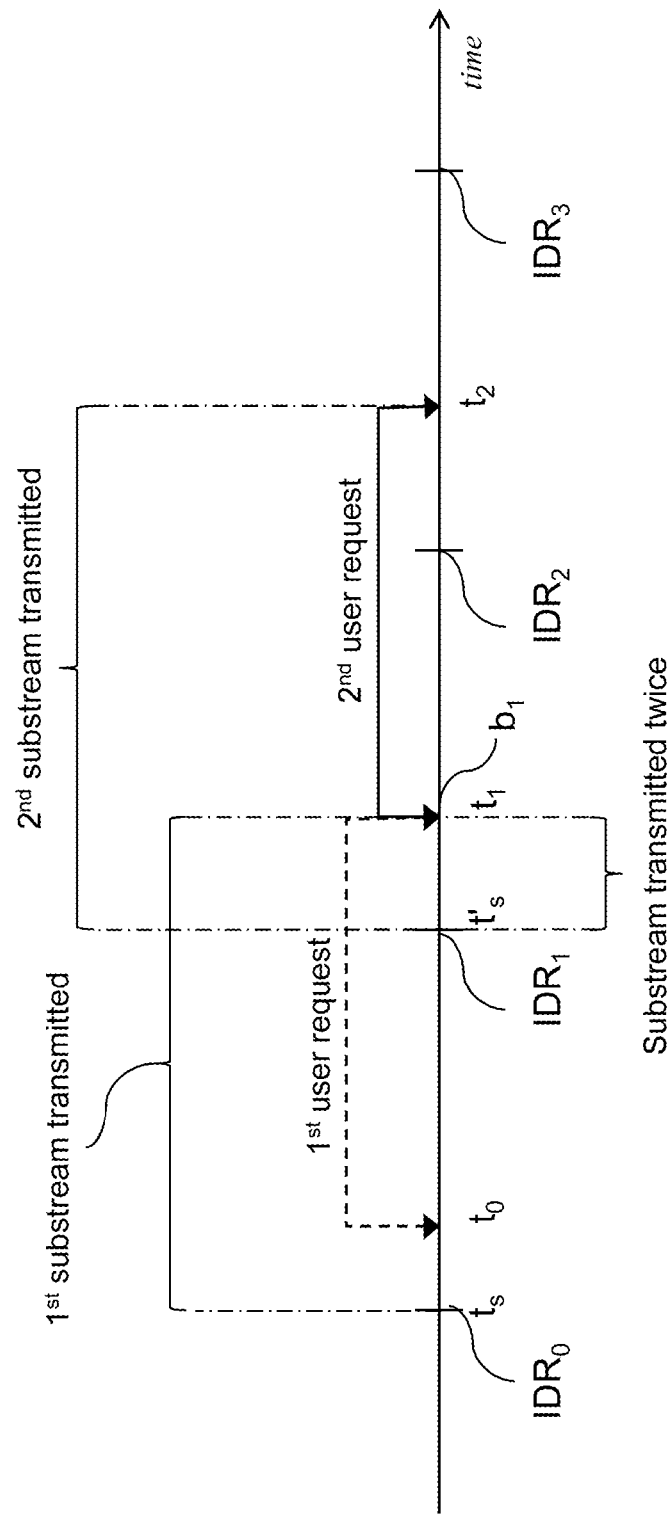
FIG. 2, already described, illustrates schematically media substreams sent by a server to a client based on classical media fragments requests.

Back to the example of FIG. 2, such a modified request would allow specifying for the second user request, in the 'Range:bytes' field, the values $b_1$-, allowing the server to send only the video portion between $b_1$ and $t_2$ and therefore avoiding the sending of a video portion twice as previously with the classical media fragment requests.

In a second embodiment, a different modification to the media fragment requests is proposed:
GET /video.mp4 HTTP/1.1
Host: www.server.com
Accept: video/*
Range: t:npt=10,20
Range-Mapping: {t:npt 11.85-20.0}={bytes 19147-/*}

In this modified media fragments request, a new field 'Range-Mapping' is added to the 'Range:t' field dedicated to specify the temporal interval of the user request. The 'Range-Mapping' field indicates in this example that the client already has in its cache 470 data up to the byte position 19146 corresponding to the time t=11.85, but the client does not have the data from that time up to the time t=20 for which the byte position in the stream is not known. This second modified request, similarly to the first modified request, amounts to requesting the server to transmit a video portion starting from byte b=19147 to the time $t_e$=20, which is missing in the client cache.

FIGS. 5a and 5b illustrate schematically the state of the cache in the cache client 470, and the data stored in the information structure representing the cache model 480. The recording of such a cache model on the client device allows the client device to generate modified media fragment requests as mentioned above, which specify plural types of addressing information, typically temporal information and byte position information, which allow the server to serve only media fragments missing from the client cache.

FIGS. 5a and 5b represent the cache contents on a linear time axis, each chunk 500, 502, 504 corresponding to a media fragment already received and stored in the cache.

FIG. 5a further represents the bounds [$a_i,b_i$] of each received fragment i. For each fragment, in the cache model 480 both a temporal information and a byte position information are stored. For example, $a_1$ has an associated time value $a_{1,time}$ and an associated byte position value $a_{1,byte}$, and similarly $b_1$ has an associated time value $b_{1,time}$ and an associated byte position value $b_{1,byte}$. The time and byte position values defining each received fragment 500, 502, 504 are stored in the information structure representative of the cache or cache model. Each corresponding video portion is stored in the cache.

A new user request, specified by the time interval [$c_{time}$, $d_{time}$], is received from the user.

FIG. 5a illustrates how the cache model can be used to generate an incremental request for supplementary or missing video portions in the client device. It can be seen that a portion of the video interval corresponding to the interval [$c_{time}$, $d_{time}$], in this case the video portion corresponding to $d_{time}$ to $b_2$, has already been received.

Therefore, the request to the server should advantageously specify that a missing part necessary on the client side is comprised between $b_2$, for example $b_{2,byte}$ and the ending $d_{time}$. It should be noticed here that the client device has no information on the byte position in the stream corresponding to $d_{time}$. However, for $b_2$, both $b_{2,time}$ and $b_{2,byte}$ addressing informations are known.

It is desirable to inform the server of the fact that some information is already contained in the client device cache, so as to avoid the process in which the server searches for a self-contained fully decodable video substream. To that end, in accordance with the aforementioned first and second embodiments, a modified request is sent to the server, including byte position information and temporal information on the temporal interval requested by the user.

One of the following modified media fragment requests is generated and sent to the server.

The modified request according to the first embodiment is as follows:
GET /video.mp4 HTTP/1.1
Host: www.server.com
Accept: video/*
Range: t:npt=$c_{time}$,$d_{time}$
Range: bytes=$b_{2,byte}$-
Range-Combination: Difference This modified request specifies to the server to start sending a video portion as from $b_{2,byte}$, as already explained above.

The modified request according to the second embodiment is as follows:
GET /video.mp4 HTTP/1.1
Host: www.server.com
Accept: video/*
Range: t:npt=$c_{time}$,$d_{time}$
Range-Mapping: {t:npt $b_{2,time}$-$d_{time}$}={bytes $b_{2,byte}$-/*}

This modified request specifies that the client requests a portion or fragment starting at $b_{2,time}$ corresponding to $b_{2,byte}$ and ending at $d_{time}$, for which the byte position is unknown, as represented by the symbol '/*'.

FIG. 5b illustrates the updating of the cache model on the client side after reception of the response from the server. Typically, the server returns the missing video fragment or substream corresponding to the request, from position $b_{2,byte}$ to $r_{time}$ corresponding to $r_{byte}$. The value $r_{time}$ should be as close as possible to the requested value $d_{time}$. However, the value $r_{time}$ may differ from $d_{time}$, for example if $d_{time}$ does not correspond to a temporal instant of a video frame or if the requested time $d_{time}$ goes beyond the total time of the video.

The interval sent can be signaled in the media fragment response via the 'Content-Range' field, which is already known in HTTP 1.0 and which specifies the byte range or byte addressing of the video portion or more generally of the media fragment sent, along with the temporal bounds.

Typically, the media fragment response from the server can comprise a header with the following information:
HTTP/1.1 206 Partial Content
Accept-Ranges: bytes, t, xywh, track, id
Content-Length: 3743
Content-Type: video/mp4
Content-Range: bytes $b_{2,byte}$-$r_{byte}$/*
Content-Range-Mapping: t:npt $b_{2,time}$-$r_{time}$/*

The information sent by the server allows the client to update its cache model. The client has now a new fragment 506 which contains the previous fragment 502 and the supplementary portion received from the server. The fragment 506 is defined by its bounds [$a_2$, $b'_2$], where $b'_2$ is defined by $r_{time}$ and $r_{byte}$ values received from the server.

Figure 6A:
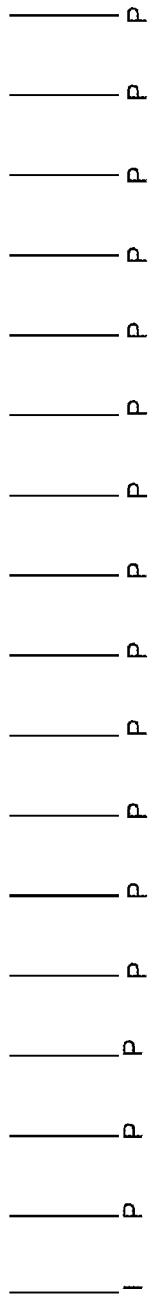
FIGS. 6*a*, 6*b* and 6*c* represent respectively various organizations of picture types in encoded video sequences.
Figure 6B:
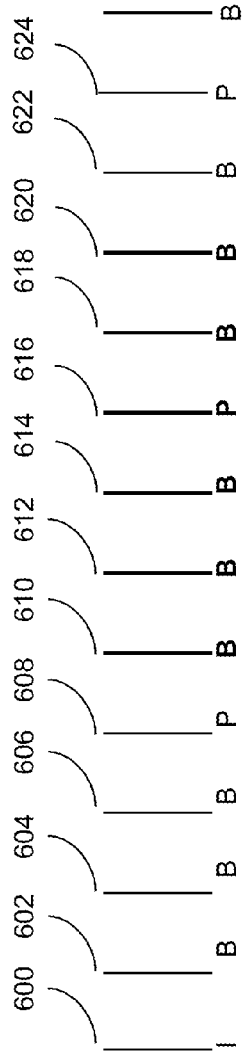
Figure 6C:
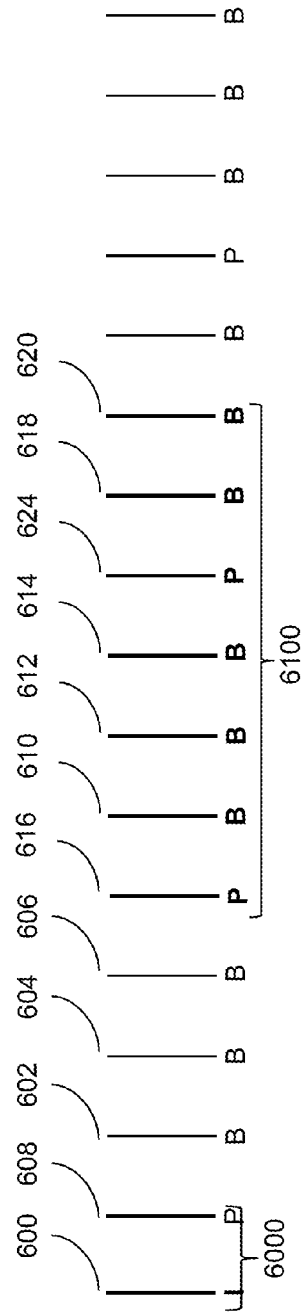

FIGS. 6a, 6b and 6c represent respectively various organizations of picture types in encoded video sequences, in order to illustrate the fact that in some cases, a non-continuous stream management is necessary, so that the client should receive several video portions.

In a preferred embodiment of this invention, the video is encoded according to H.264/AVC compression standard.

FIG. 6a illustrates a video sequence composed of I pictures and P pictures. The I pictures are INTRA encoded, also referred to as IDR pictures in H.264/AVC, so they can be decoded independently from any other picture of the video sequence. The P pictures are of predicted type, so that each P picture is predicted from one or several reference pictures already coded in the video sequence, so the reference pictures precede temporally the P picture. In the case of FIG. 6a, the picture order in the coded stream is identical to the picture order for display. Consequently, a given time interval corresponds to a contiguous portion or fragment of the video stream. The examples of media fragment requests given above apply straightforwardly in this case.

The example of sequence illustrated in FIG. 6b also comprises B pictures. A B picture is predicted both from a reference picture in the past (forward temporal prediction) and from a reference picture in the future (backward temporal prediction). Hence, in a sequence containing B pictures as well as I and P pictures, the coding and decoding order differs from the order of display of the pictures of the sequence. For example, FIG. 6b contains the B pictures labeled 602, 604, 606, 610, 612, 614, 618, 620, 622 and the P pictures labeled 608, 616, 624.

FIG. 6c illustrates the decoding order of the pictures of FIG. 6b. In such a case, a response to a request for a time interval may consist in a non-contiguous video substreams.

For example, if the requested pictures corresponding to the time interval are pictures 610 to 620, which correspond to a contiguous time interval for the display, then the pictures marked in bold in FIG. 6c, corresponding to intervals 6000 and 6100, should be provided to the media fragment client. Indeed, the client needs to receive all the pictures useful for the decoding of the requested time interval, which includes all the pictures that are needed as reference for the decoding of the requested pictures. Typically, all the P pictures (608, 616, 624) and the I pictures (600) used in the encoding of pictures of the requested time interval are necessary in this example. As shown in FIG. 6c, this leads to the transmission of two non connected time intervals as a response.

Therefore, even though in the simple example of FIG. 6a, the requested time interval corresponds to a contiguous fragment or portion of video, in other more complex cases, the request of a time interval for display leads the server to send a plurality of video portions. The proposed modifications of the video fragment requests is fully compatible with such more complicated situations, since it allows working out the combination or difference between the several fragments requested and the fragments already stored in the client device cache.

The cache management of a plurality of received fragments or portions will be explained in more detail with respect to FIG. 8.

Figure 7:
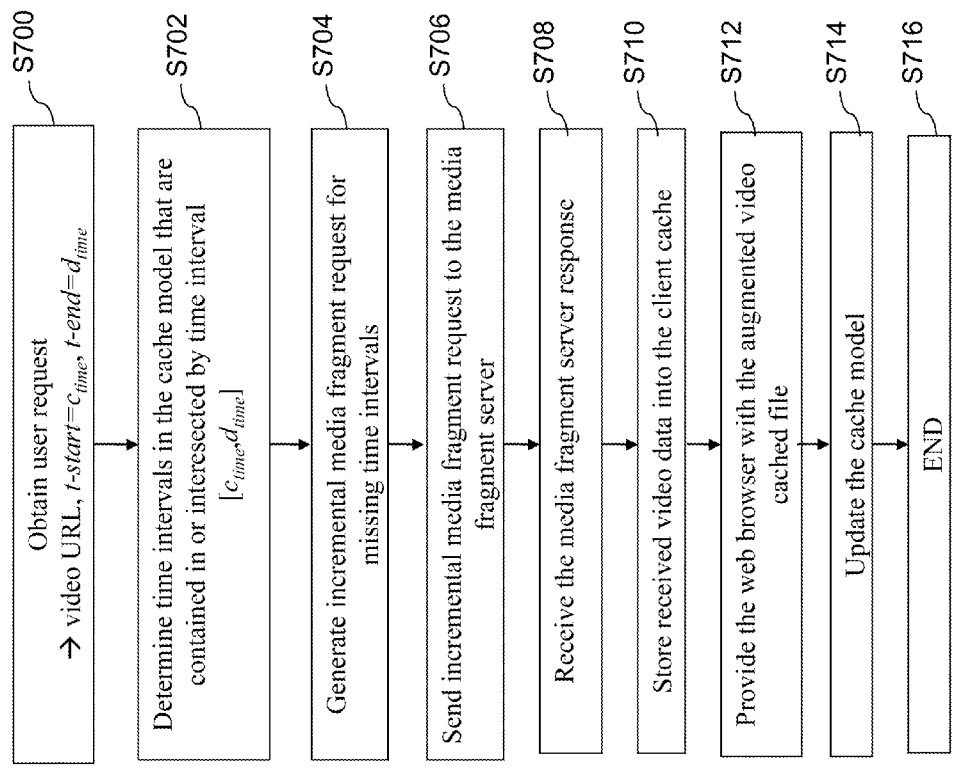
FIG. 7 illustrates the main steps of a method of generating a media fragment request and of receiving, on a client device, fragments of an encoded media stream stored on a server device according to an embodiment of the invention.

The flow diagram in FIG. 7 illustrates the main steps of a method of generating a media fragment request and of receiving, on a client device, fragments of an encoded media stream stored on a server device according to an embodiment of the invention.

All the steps of the algorithm represented in FIG. 7 can be implemented in software and executed by the central processing unit 1111 of the device 1000.

Firstly, in step S700, the client device, and in particular the Media Fragment client 460 of FIG. 4, receives a user request, containing an address or URL (Uniform Resource Locator) of a video, as well as a temporal interval, defined by a starting time $c_{time}$ and an ending time $d_{time}$.

Next, in step S702, the client device determines, according to the stored cache model, which is a structure representing information on the media fragments or video portions in this example already retrieved and stored on the client, as already explained with reference to FIG. 5. Typically, the client cache contains a number n of fragments corresponding for example to temporal intervals in the video, defined by their bounds $[a_i,b_i]$, i=1, . . . , n. The client then may determine the time intervals that intersect or that are contained in the requested time interval $[c_{time}, d_{time}]$, as schematically illustrated with respect to FIG. 5.

An incremental media fragment request for missing time intervals is then generated in step S704. As already explained, such a request may take various forms, but it specifies, in addition to the start time and end time information, which is a temporal addressing information, one or several pieces of byte position information which can be used by the server to deduce the supplemental data portions missing from the client cache.

In a general format, according to the first embodiment, the request may take the following form:

GET /video.mp4 HTTP/1.1
Host: www.server.com
Accept: video/*
Range: t:npt=$c_{time}$,$d_{time}$
Range: bytes=$a_{1,byte}$-$b_{1,byte}$, $a_{2,byte}$-$b_{2,byte}$, . . . , $a_{n,byte}$-$b_{n,byte}$
Range-Combination: Difference In this first type of request, the client simply specifies all fragments already received in byte addressing, and leaves the server to determine the missing parts.

According to the second embodiment, the difference between the requested interval and the time intervals already received is calculated.

Typically the difference takes the following form:

$$[c_{time},a_1]\cup[b_1,a_2]\cup[b_2,a_3]\cup \ldots \cup[b_n,d_{time}]$$

where the symbol '$\cup$' stands for the 'union'.
The corresponding request may take the following form:
GET /video.mp4 HTTP/1.1
Host: www.server.com
Accept: video/*
Range: t:npt=$c_{time}$,$d_{time}$
Range-Mapping: {t:npt $c_{time}$,$a_{1,time}$}={bytes-$a_{1,byte}$/*},
{t:npt $b_{1,time}$,$a_{2,time}$}={bytes $b_{1,byte}$-$a_{2,byte}$/*}, . . . ,
{t:npt $b_{n,time}$-$d_{time}$}={bytes $b_{n,byte}$-/*}

It should be noted that the client determines first where $c_{time}$ is situated with respect to the currently stored fragments, according to the cache model. For example, if the value $c_{time}$ is contained in $[a_1,b_1]$, then $[c_{time},a_1]$ does not appear in the request. Similarly, if $d_{time}$ is contained in $[a_n,b_n]$ then $[b_n,d_{time}]$ does not appear in the request.

More generally, only the intervals intersecting $[c_{time},d_{time}]$ should appear in the request.

The generated incremental media fragments request is sent to the server in step S706.

Then the client device receives the response from the server in step S708, including the missing video portions and a response header as already mentioned with respect to FIGS. 5a and 5b.

The received video portion or portions are stored in the client cache 470 in step S710 and then the video cache file containing all received portions, referred to as an augmented video cached file, is provided to the Web Browser 450, for example for display, in step S712.

Figure 8:
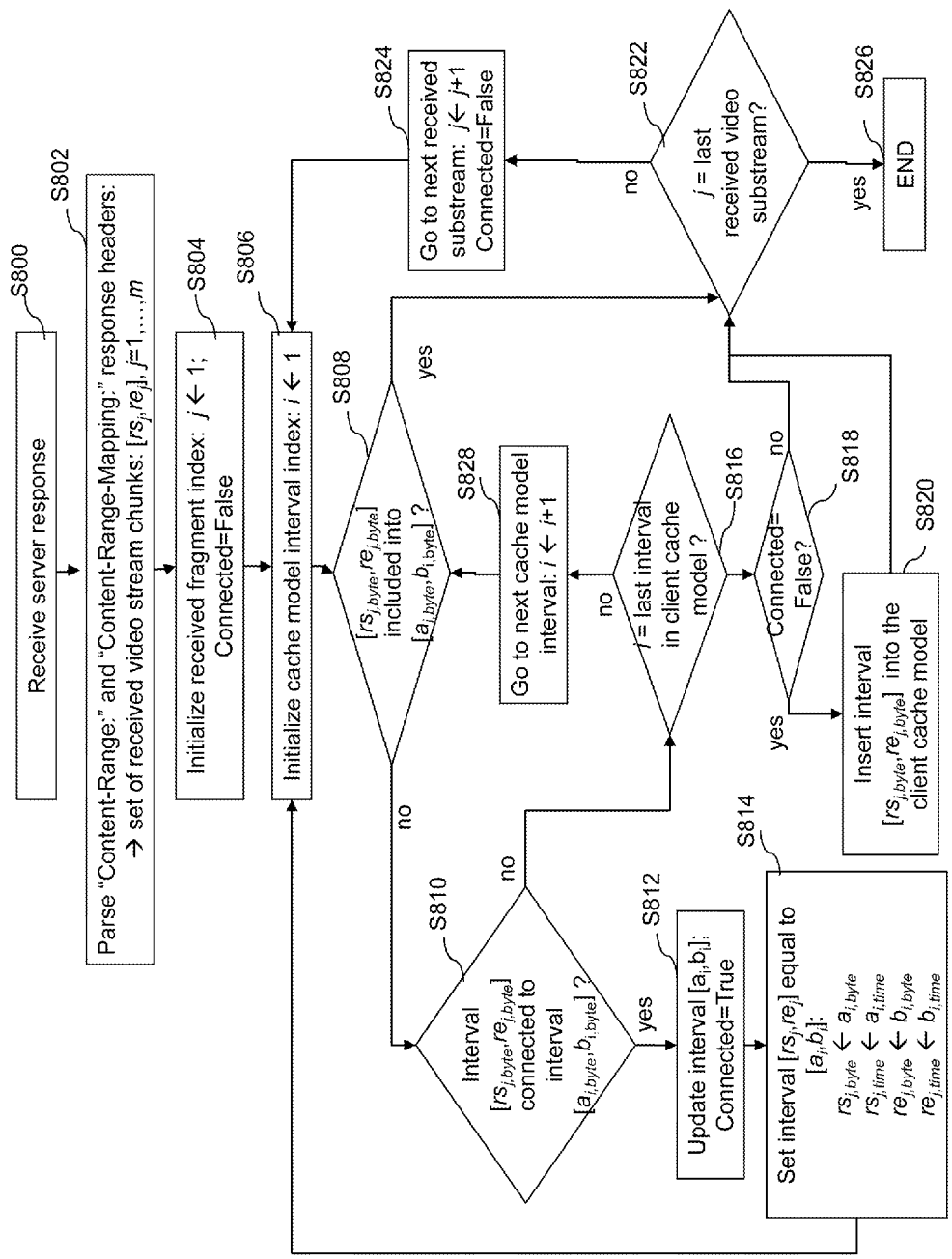
FIG. 8 illustrates the main steps of a method for updating a structure representative of the cache of a client device according to an embodiment of the invention.

Finally, the cache model is updated in step S714, as explained in detail hereafter with respect to FIG. 8.

The algorithm ends at step S716 following step S714.

The flow diagram in FIG. 8 illustrates the main steps of a method for updating a structure representative of the cache, or cache model, of a client device according to an embodiment of the invention.

All the steps of the algorithm represented in FIG. 8 can be implemented in software and executed by the central processing unit 1111 of the device 1000.

It is supposed here that the client device has already received at least one video portion and has initialized the cache model with one or several intervals $[a_i,b_i]$.

In step S800, the client receives the Media Fragment server response in HTTP format.

Next, in step S802, the client parses the response headers "Content-Range" and "Content-Range-Mapping" which provide addressing information relative to the time bounds and to the corresponding byte positions (byte-range) of the received video portion or portions.

For example, a typical Media fragment server response would be:
HTTP/1.1 206 Partial Content
Accept-Ranges: bytes, t, xywh, track, id
Content-Length: 3743
Content-Type: video/mp4
Content-Range: bytes 0xFF00-0x1A2230/0xFFFFFFFF
Content-Range-Mapping: t:npt 11.85-21.16/653.

Such a response specifies a "Content-Range" in bytes, between a $b_{start}$=0xFF00 and a $b_{end}$=0x1A2230, which correspond respectively to a start time value $t_{start}$=11.85 and a time end value $t_{end}$=21.16. The value 0xFFFFFFFF indicates the total length of the encoded video stream stored on the server side, whereas '653' is the total time duration of the video.

More generally, a response comprises a series of intervals $[rs_j, re_j]$, j=1 . . . m, and each bound $rs_j$, $re_j$ has an associated time position $rs_{j,time}$, $re_{j,time}$ and an associated byte position $rs_{j,byte}$, $re_{j,byte}$ which can be extracted from the response headers.

Once the bounds or intervals of the received video portions are extracted, a loop on these intervals is performed.

In step S804, an index j is initialized to 1 and a Boolean variable 'Connected' is initialized to 'False'. The index j is used to process the media fragments received. An index i is initialized to 1 in step S806. The index i is used in a loop analyzing the intervals already represented in the cache model which refer to already received portions.

Step S806 is followed by step S808 which checks whether the current newly received interval considered $[re_{j,byte}, re_{j,byte}]$ is included in the already stored interval $[a_{i,byte}, b_{i,byte}]$. It should be noted that preferably, in the cache model, the intervals are associated with an index which increases with their byte position in the whole of the video stream.

In case of positive answer, the received video fragment was already received. It should be noted that thanks to the incremental media fragment requests, this situation should not occur, since the re-transmission of media fragments should be avoided. However, this situation is mentioned for completeness of the algorithm. In case of positive answer, test S808 is followed by test S822 described hereafter.

In case of negative answer to the test S808, so if the currently processed video interval of index j is not comprised in the considered cache model interval of index i, step S808 is followed by test S810 which checks if the two intervals are connected. In this embodiment, connected means either they have a common bound (see the example of FIG. 5b where the received fragment is connected to interval $[a_2,b_2]$) or if they intersect. The intersection means that one bound of the received interval is comprised between the bounds of the stored interval.

In case of connection, the currently stored interval $[a_i, b_i]$ is updated in step S812. Typically one of the bounds is updated with the values of the received interval. For example, referring again to FIG. 5b, bound $b_2$ is replaced by $b'_2$. Further, in step S812, the variable 'Connected' is set to the value 'True'.

The updating of the interval is followed by step S814 in which the bounds of the received interval are set to the updated bounds of the stored interval. This allows merging the updated interval of index i with other intervals of the cache model during the following iterations of the algorithm. The step S814 is then followed by step S806 already described.

In case no connection is detected, step S810 is followed by step S816 which checks whether the index i corresponds to the last interval stored in the cache. In case of negative answer to the test S816, this step is followed by step S828 which increases the index i by one, and goes next to step S808 already described.

In case of positive answer, so if the interval of index i is the last one stored in the cache model, step S816 is followed by step S818 which checks whether the received video portion of index j was found to be connected to any video portion already stored. In practice, the step S818 compares the value of the variable 'Connected' to 'False'. In case of positive answer, so if the received interval or video portion was not found to be connected to any interval already stored in the cache, step S818 is followed by step S820 of inserting the interval of index j in the cache model. In practice, the number of intervals stored in the cache model increases, and the indices associated to the intervals shall be updated accordingly to the insertion of the new interval in the cache model. Step S820 is then followed by step S822.

If the interval j was already found to be connected to an existing interval, step S816 is followed also by step S822, checking whether the index j corresponds to the last received new fragment. In case of negative answer, so if j is not the index of the last fragment received, step S822 is followed by step S824 which increases the index j by one, which is then followed by step S806 already described.

In case of positive answer, all the received fragments have been processed and the algorithm ends (S826).

Figure 9:
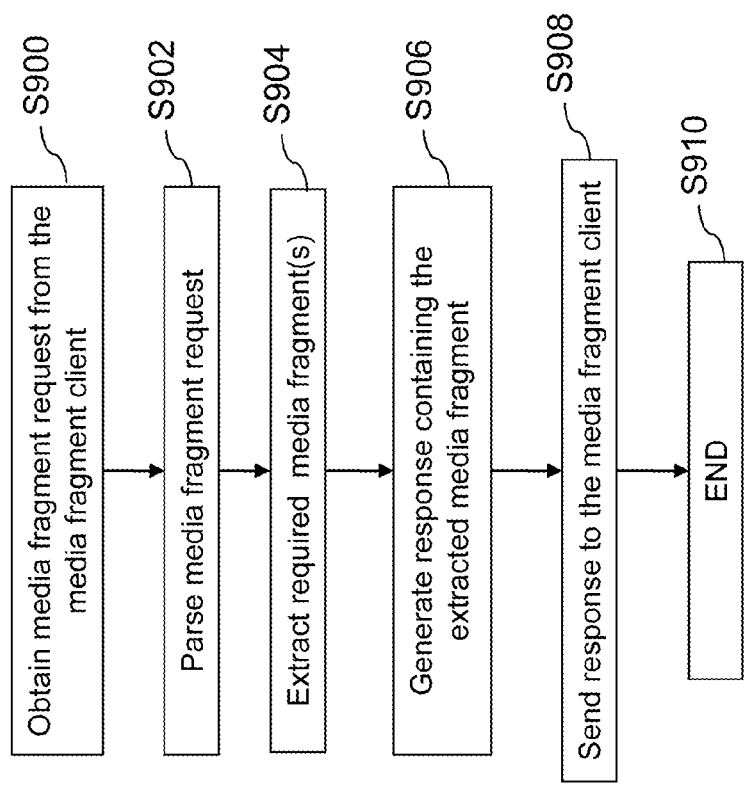
FIG. 9 illustrates the main steps of an algorithm implemented by a server device for serving media fragments.

FIG. 9 illustrates the main steps of an algorithm implemented by a server device for serving media fragments. All the steps of the algorithm represented in FIG. 9 can be implemented in software and executed by the central processing unit 1111 of the device 1000.

The Media fragment server (e.g. server 400 of FIG. 4) receives a media fragment request from a Media fragment client in step S900.

The request is typically an incremental request generated as explained with respect to FIG. 7.

The Media fragment server parses the media fragment request in step S902 and then extracts in step S904 the required media fragment or fragments, which are video portions when the stream to be served is a video. This step is implemented as explained in further detail with respect to FIG. 10.

Once the media fragments or fragments have been extracted, the media fragments server generates a media fragment response, typically a classical response according to the Media Fragment URI 1.0 specification. In particular, such a response contains the headers "Content-Range" and "Content-Range-Mapping" according to HTTP format. These headers carry temporal type and position type addressing information relative to the extracted fragments, which will be used by the media fragment client to update the cache model.

Next, the server's response and the extracted media fragments are sent to the media fragment client in step S908 and the algorithm ends (S910).

Figure 10:
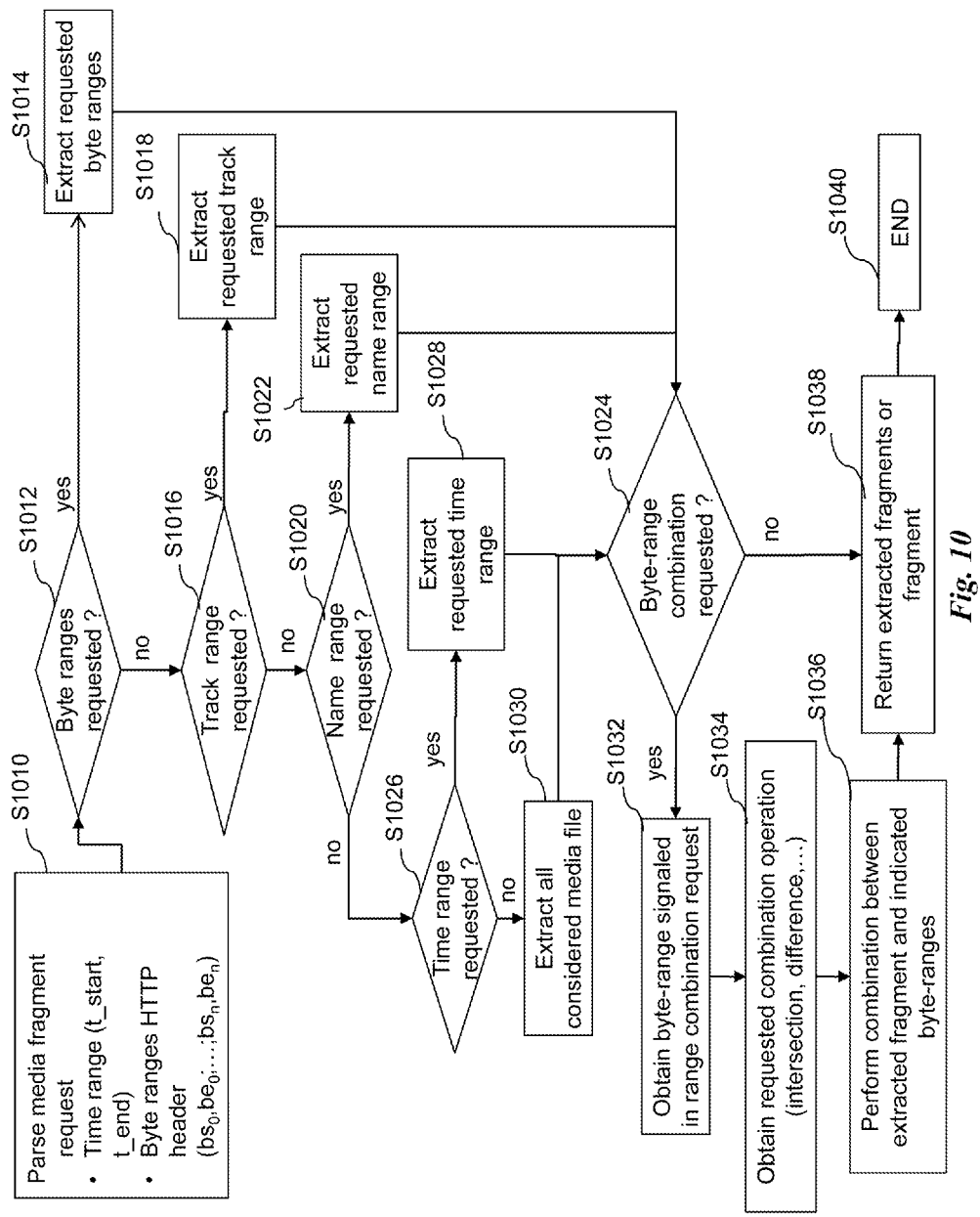
FIG. 10 illustrates the main steps of a method of extracting media fragments, implemented by a server device, according to an embodiment of the invention.

FIG. 10 illustrates the main steps of a method of extracting media fragments, implemented by a server device, according to an embodiment of the invention. All the steps of the algorithm represented in FIG. 10 can be implemented in software and executed by the central processing unit 1111 of the device 1000.

The algorithm starts with step S1010 of parsing the media fragment request, which corresponds to step S902 of FIG. 9. In particular, the media fragment server extracts the requested time range information (t_start, t_end) and the byte ranges referring to fragments stored in the client device cache, in the intervals of index 0 to n, $(bs_0, be_0; \ldots; bs_n, be_n)$.

Next, step S1012 checks whether the request comprises a byte-range, and in case of positive answer, the byte-range requested is extracted in step S1014.

In case of negative answer to test S1012, the media fragment server checks whether a track, as specified in the ISO MPEG-4 format specification, has been requested in step S1016. In case of positive answer, the requested track is extracted in step S1018.

In case of negative answer to test S1016, the media fragment server checks in step S1020 whether a name range, as defined in the specification Media Fragments URI 1.0, is specified in the request. In case of positive answer, the requested name range is extracted in step S1022.

In case of negative answer to test S1020, the media fragment server checks in step S1026 whether a time range is specified in the request. In case of positive answer, the media fragment corresponding to the whole time range is extracted in step S1028. In case of negative answer, it means that the request does not specify particular parameters, so the entire stream is requested. The stream is extracted in step S1030.

Steps S1014, S1018, S1022, S1028 and S1030 are all followed by the test S1024 checking whether a combination of several addressing information types, such as time range information and byte position information, corresponding to an incremental media fragment request as generated in the algorithms described above, is present in the request. In practice in the embodiments described, this amounts to checking whether a "Range-Combination' or a "Range-Mapping" header is specified in the media fragment request.

In case of positive answer, steps S1024 is followed by step S1032 of obtaining the byte-range signaled in the range combination request. The byte position information is applied strictly by the server, without searching for a portion which is self-contained and can be systematically decoded as in the case of the application of the classical Media Fragments URI 1.0 specification. This data is retrieved from the result of the parsing step S1010.

Further, if applicable, the server also obtains in step S1034 from the request the information relating to the type of combination, such as 'difference' or 'intersection', as for example specified in the first embodiment in the "Range-Combination" field.

Next, the combination is performed in step S1036 between the extracted media fragment corresponding to the entire time range and the byte ranges obtained in step S1032.

Finally, one or several fragments are defined and extracted in step S1038. This operation modifies the previously extracted media fragment so as to generate only the parts missing from the client device cache. These fragments are then provided for the response to the media fragment client.

In case of negative answer to the check S1024, so if the media fragment request is not a request as modified in the embodiment of FIG. 7, the media fragment server simply returns the fragment extracted in step S1028.

Finally, the algorithm ends at step S1040.

The embodiments described above concern the generation of a media fragment request mixing a byte position information and a temporal position information to obtain incremental fragments of a media stream, to complete the data already received and stored in a client cache.

However, the invention is not limited to such an example.

For example, it may also be envisaged to use a similar mechanism for requesting various spatial portions of a media stream, such as a video stream. Therefore, the examples may be straightforwardly transposed by replacing the temporal addressing used in the generated media fragments requests by a spatial addressing. More generally, spatial and temporal addressing may also be mixed to provide incremental spatio-temporal requests, mixing temporal, spatial and byte position addressing, to allow the server to extract portions of a video stream that are missing in the client device.

More generally, any modification or improvement of the above-described embodiments, that a person skilled in the art may easily conceive should be considered as falling within the scope of the invention.

The invention claimed is:

1. A method of requesting fragments of an encoded media stream stored on a server device, the method being implemented by a client device storing a structure representative of fragments of the media stream previously received and stored on the client device, the structure comprising first and second types of addressing information associated with fragments already received, and the method comprising:
   receiving a user request for a first media fragment having a first portion overlapping with at least one of the already received fragments; and
   forming a media fragment request to obtain media data corresponding to a new fragment of the media stream, the media fragment request specifying at least one piece of addressing information of the first type and at least one addressing information of the second type, wherein the first type of addressing information is spatial or temporal information and wherein the second type of addressing information is byte position information within the media stream;
   wherein the new fragment corresponds to a second portion of the first media fragment that is contiguous with the first portion and does not overlap with the already received fragments, the second portion being specified by the at least one piece of addressing information of the first type and the at least one piece of addressing information of the second type.

2. A method of receiving, on a client device, fragments of an encoded media stream stored on a server device, wherein the client device stores a structure representative of fragments of the media stream previously received and stored on the client device, the structure comprising first and second types of addressing information associated with fragments already received,
   the method comprising the steps of:
      forming a media fragment request using the method of requesting fragments of an encoded media stream according to claim 1,
      sending the formed media fragment request to the server device, and
      receiving at least one media fragment from the server device.

3. The method according to claim 2, further comprising a step of storing the received media fragment or fragments in a local storage.

4. The method according to claim 3, further comprising receiving, from the server device, for each received fragment, at least one piece of addressing information of the first type and one piece of addressing information of the second type.

5. The method according to claim 4, further comprising a step of updating the structure representative of media fragments based upon the received pieces of addressing information.

6. The method according to claim 5, wherein the addressing information of the second type stored by the structure representative of media fragments includes, for each the media fragment, at least starting addressing information and ending addressing information, each of the starting addressing information and ending addressing information having an associated byte position value.

7. The method according to claim 6, wherein the updating step comprises, for each received media fragment:
   checking whether the received media fragment has a common portion with a media fragment previously received and stored, and
   in case of positive checking, modifying one of the starting addressing information or the ending addressing information representative of the previously stored media fragment to designate an augmented stored media fragment.

8. A method of sending, from a server device to a client device, fragments of an encoded media stream stored on the server device, the method comprising:
   receiving a media fragment request for a new fragment of the encoded media stream, the new fragment being part of a first media fragment having a first portion overlapping with at least one of the already received fragments and having a second portion of the first media fragment that is contiguous with the first portion and does not overlap with the fragments already received in the client device, the media fragment request specifying the new fragment using at least one piece of addressing information of a first type and at least one addressing information of a second type, wherein the first type of addressing information is spatial or temporal information and wherein the second type of addressing information is byte position information within the media stream,
   processing the media fragment request received to obtain at least one piece of byte position addressing information of a portion of the requested media fragment,
   extracting at least one media fragment of the encoded media stream corresponding to the at least one piece of byte position addressing information obtained,
   forming a response containing the extracted media fragment or fragments, and
   sending the formed response to the client device.

9. The method according to claim 8, further comprising a step of inserting, in the response, for each the extracted media fragment, at least one piece of addressing information of the first type and one piece of addressing information of the second type representative of a starting point and/or an ending point of the extracted media fragment.

10. An apparatus for requesting fragments of an encoded media stream stored on a server device, the apparatus being a client device storing a structure representative of fragments of the media stream previously received and stored on the client device, the structure comprising first and second types of addressing information associated with fragments already received, the apparatus comprising:
- means for receiving a user request for a first media fragment having a first portion overlapping with at least one of the already received fragments; and
- client device means for forming a media fragment request to obtain media data corresponding to a new fragment of the media stream, the media fragment request specifying at least one piece of addressing information of the first type and at least one piece of addressing information of the second type, wherein the first type of addressing information is spatial or temporal information and wherein the second type of addressing information is byte position information within the media stream;
- wherein the new fragment corresponds to a second portion of the first media fragment that is contiguous with the first portion and does not overlap with the already received fragments, the second portion being specified by the at least one piece of addressing information of the first type and the at least one piece of addressing information of the second type.

11. An apparatus, adapted to receive fragments of an encoded media stream stored on a server device, the apparatus comprising:
- means for storing a structure representative of fragments of the media stream previously received and stored on the apparatus, the structure comprising first and second types of addressing information associated with fragments already received;
- means for receiving a user request for a first media fragment having a first portion overlapping with at least one of the already received fragments;
- client device means for forming a media fragment request to obtain media data corresponding to a new fragment of the media stream, the media fragment request specifying at least one piece of addressing information of the first type and at least one piece of addressing information of the second type, wherein the first type of addressing information is spatial or temporal information and wherein the second type of addressing information is byte position information within the media stream;
- means for sending the formed media fragment request to the server device; and
- means for receiving at least one media fragment from the server device;
- wherein the new fragment corresponds to a second portion of the first media fragment that is contiguous with the first portion and does not overlap with the already received fragments, the second portion being specified by the at least one piece of addressing information of the first type and the at least one piece of addressing information of the second type.

12. A server device, adapted to send fragments of an encoded media stream stored on the server device to a client device, the server device comprising:
- means for receiving a media fragment request for a new fragment of the encoded media stream, the new fragment being part of a first media fragment having a first portion overlapping with at least one of the already received fragments and having a second portion of the first media fragment that is contiguous with the first portion and does not overlap with the fragments already received in the client device, the media fragment request specifying the new fragment using at least one piece of addressing information of a first type and at least one addressing information of a second type, wherein the first type of addressing information is spatial or temporal information and wherein the second type of addressing information is byte position information within the media stream,
- means for processing the media fragment request received to obtain at least one piece of byte position addressing information of a portion of the requested media fragment,
- means for extracting at least one media fragment of the encoded media stream corresponding to the at least one byte position addressing information obtained,
- server means for forming a response containing the extracted media fragment or fragments, and
- means for sending the formed response to the client device.

13. A non-transitory computer readable medium storing a computer program which, when executed on a computer, causes the computer to carry out the method for requesting fragments of an encoded media stream according to claim 1.

14. A non-transitory computer readable medium storing a computer program which, when executed on a computer of a server device, causes the computer to carry out the method of sending fragments of an encoded media stream according to claim 8.

* * * * *